United States Patent
Yamada

(10) Patent No.: US 7,583,297 B2
(45) Date of Patent: Sep. 1, 2009

(54) IMAGE PROCESSING METHOD, IMAGE PROCESSING APPARATUS, AND COMPUTER PROGRAM USED THEREWITH

(75) Inventor: Rui Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 821 days.

(21) Appl. No.: 11/040,570

(22) Filed: Jan. 21, 2005

(65) Prior Publication Data

US 2005/0190288 A1 Sep. 1, 2005

(30) Foreign Application Priority Data

Jan. 23, 2004 (JP) .............................. 2004-015789

(51) Int. Cl.
*H04N 9/73* (2006.01)
*H04N 5/222* (2006.01)

(52) U.S. Cl. .................................... 348/224.1; 348/371

(58) Field of Classification Search .............. 348/223.1, 348/224.1, 225.1, 370, 371, 208.13
See application file for complete search history.

(56) References Cited

U.S. PATENT DOCUMENTS

| | | | | |
|---|---|---|---|---|
| 5,001,552 A | * | 3/1991 | Okino | 348/224.1 |
| 5,550,587 A | * | 8/1996 | Miyadera | 348/224.1 |
| 5,568,194 A | * | 10/1996 | Abe | 348/224.1 |
| 5,808,681 A | * | 9/1998 | Kitajima | 348/371 |
| 6,859,565 B2 | * | 2/2005 | Baron | 382/275 |
| 7,002,624 B1 | * | 2/2006 | Uchino et al. | 348/223.1 |
| 7,148,922 B2 | * | 12/2006 | Shimada | 348/370 |
| 2004/0080623 A1 | * | 4/2004 | Cleveland et al. | 348/208.1 |
| 2005/0243175 A1 | * | 11/2005 | Yamada et al. | 348/207.1 |

FOREIGN PATENT DOCUMENTS

| | | |
|---|---|---|
| JP | 08-051632 | 2/1996 |
| JP | 08-340542 | 12/1996 |
| JP | 09-074516 | 3/1997 |
| JP | 2000-307940 | 11/2000 |
| JP | 2000-308068 | 11/2000 |
| JP | 2001-078202 | 3/2001 |
| JP | 2003-296720 | 10/2003 |

OTHER PUBLICATIONS

Japanese Office Action from the Japanese Patent Office, in JP 2004-015789 filed Jan. 23, 2004.

* cited by examiner

*Primary Examiner*—Nhan T Tran
(74) *Attorney, Agent, or Firm*—Finnegan, Henderson, Farabow, Garrett & Dunner, L.L.P.

(57) ABSTRACT

An image processing method and apparatus performs calculating flash-component image data based on a first image captured without flash emission and a second image captured with flash emission, and generating a finally-adjusted image by using an intensity-adjusted flash-component image generated by executing intensity adjustment on the flash-component image data. The method and apparatus can generate a high quality image in which saturated pixels in a nonlinear transformation image, that is, overexposed highlights are reduced.

17 Claims, 8 Drawing Sheets

IMAGE PROCESSING METHOD, IMAGE PROCESSING APPARATUS, AND COMPUTER PROGRAM USED THEREWITH

BACKGROUND OF THE INVENTION

1. Field of the Invention

The present invention relates to image processing methods, image processing apparatuses, and computer programs used therewith. More specifically, the present invention relates to an image processing method and apparatus that generate a high quality image by executing pixel-value correcting processing using an image captured with flash emission and an image captured without flash emission, estimating an optimal flash intensity, and performing correction based on the result of estimation, and to a computer program used therewith.

2. Description of the Related Art

Flashes, such as electrical flashes or strobes, are used as auxiliary light sources when cameras capture images. In recent years, digital still cameras (DSCs) have become rapidly spread. DSCs often use flash emission when capturing images. The use of flash emission enables various types of image capturing such as fill-in light (technique which, when a too dark shadow appears on a person's face, weakens the shadow), backlight correction (technique which, when an image of a person against the sun is captured, prevents the person's face from being darkened), catchlight (technique that captures a person's image having beautiful pupils by putting "twinkling light points" in the pupils of eyes), and daylight synchronization (technique that uses flashlight as auxiliary light in the daytime and in the evening). However, image capturing using flash emission may break color balance and may cause an overexposed highlight.

In general, in DSCs, white balance control is performed so that an image of a white subject is captured in white. For example, when image capturing is performed under a light-component environment in which light, such as natural light, illumination, or flashlight (strobe), emitted to a subject, has a high color temperature, and which has a strong blue component, sensitivity to the blue component is suppressed and sensitivity to a red component is relatively enhanced. Conversely, when image capturing is performed in a light-component environment in which light emitted to a subject has a low color temperature and which has a strong red component, white balance control is performed, such as suppressing the sensitivity to the red component and relatively enhancing the sensitivity to the blue component.

In white balance control, adjusting processing in which adjustment parameters are set in accordance with a light source for use in image capturing is normally executed. For example, when image capturing using flash emission is performed, white balance control is performed based on parameters in accordance with light components of flashlight in use.

Nevertheless, when, in a state in which there is external light other than flashlight, image capturing using flash emission is performed, two types of light, that is, the flashlight and the external light, are emitted onto a subject. Light reflected by the subject reaches an imaging element of a camera, thus causing image capturing. In the case of the above image capturing, by performing white balance control in accordance with flashlight, a part of the subject which receives a large amount of the flashlight is adjusted to have natural color. However, for an area whose image is captured as an image of reflected light caused by only the external light since the flash emission does not reach the imaging element of the camera, for example, a background image area, when white balance control is performed based on parameter settings in accordance with light components of the flashlight, no appropriate white balance control is executed, so that the area is output in a form having unnatural color.

Conversely, in the case of executing white balance control matching the background area, that is, white balance control on the entirety of the captured image on the assumption that only the external light is used for image capturing, a portion which receives a large amount of the flashlight is adjusted to have unnatural color.

Several configurations for coping the above problems have been proposed. For example, Japanese Unexamined Patent Application Publication No. 8-51632 discloses a configuration that performs acquiring an image captured without flash emission and an image captured with flash emission, dividing the two captured images into blocks, comparing luminances in each block, and, based on the result of comparison, implementing different white balance control in each block for the image captured with flash emission.

Regarding the white balance control, one of white balance control matching flashlight in each block, white balance control matching intermediate light between flashlight and external light, and white balance control matching external light is selected and executed. In this configuration, processing must be performed in units of blocks. Accordingly, when a problem causing block distortion occurs, and when a subject moves, it is impossible to perform appropriate processing.

Japanese Unexamined Patent Application Publication No. 2000-308068 discloses the following configuration. Specifically, at first, an image is captured with flash emission, the aperture opened, and the exposure time shortened. After that, an image is captured without using flash emission on an originally intended exposure condition. The former is called the "first image", and the latter is called the "second image". In the first image, pixels having values equal to or greater than a predetermined value are registered as a main subject area, and other pixels in the second image are registered as a background area. After that, white balance control on the first image is performed in accordance with the flash emission, and white balance control on the second image is performed in accordance with the external light. By combining the main subject area in the first image and the background area in the second image, a final recording image is formed.

However, in this configuration, it is impossible to perform white balance control on a subject that receives both the external light and the flashlight.

Japanese Unexamined Patent Application Publication No. 2000-307940 discloses a configuration including the configuration in Japanese Unexamined Patent Application Publication No. 2000-308068 and an image blurring detecting means. When the blurring is detected, the above first image is used as a recording image without being changed, and the first and second images are not combined. Accordingly, when the blurring is detected, in-image unnaturalness caused by a difference in color temperature between the flash emission and the external light cannot be eliminated.

Japanese Unexamined Patent Application Publication No. 8-340542 discloses a configuration that performs dividing the luminances of pixels of an image captured with flash emission by the luminances of corresponding pixels of an image captured without flash emission to find a contribution ratio of the flashlight, and, based on the contribution ratio, performing white balance control on the image captured with flash emission.

In this configuration, for an image captured with a mixture of flashlight and external light, white balance control parameters for the flashlight and the external light are simply interpolated based on the contribution ratio of flashlight, whereby a final image is generated. However, when considering a physical reflection model of light, a flashlight component and an external light component must be separately processed. Therefore, an optimal final image cannot be generated only by processing the image captured with the mixture of the flashlight and the external light.

SUMMARY OF THE INVENTION

It is an object of the present invention to correct the above adverse phenomena occurring in image capturing with flash emission.

It is another aspect of the present invention to provide an image processing method and apparatus which perform optimal white balance control on an image captured in an environment having both external light and flashlight, and in which, when the intensity of flashlight is too strong or too weak, by estimating an optimal intensity of flashlight, and performing correction based on an adjusted image corresponding to the estimated optimal flashlight intensity, a high quality image is generated, and to provide a computer program used therewith.

According to an aspect of the present invention, an image processing method is provided which includes a flash-component-image calculating step of calculating flash-component image data based on first image data captured without flash emission and second image data captured with flash emission, an intensity-adjusting-value calculating step of calculating an intensity adjusting value for the flash-component image data, an intensity-adjusted-flash-component-image calculating step of calculating intensity-adjusted-flash-component image data by using the intensity adjusting value, and a finally-adjusted-image generating step of generating finally-adjusted image data based on the first image data and the intensity-adjusted-flash-component image data.

Preferably, the flash-component-image calculating step includes the step of calculating differential image data representing differences between the first image data and the second image data, and the step of executing white balance control on the differential image data based on a parameter corresponding to a flashlight component, and in the intensity-adjusting-value calculating step, the intensity adjusting value is calculated for the flash-component image data, on which the white balance control is performed.

In the finally-adjusted-image generating step, the finally-adjusted image data may be generated based on: (a) white-balance-controlled first image data obtained by executing white balance control on the first image data based on a parameter corresponding to an external light component, and (b) intensity-adjusted-flash-component image data obtained by executing intensity adjustment on flash-component image data obtained by executing intensity adjustment based on a parameter corresponding to a flashlight component.

In the intensity-adjusting-value calculating step, the intensity adjusting value may be calculated as an adjusting value for reducing the number of pixels which have saturated values and which are included in a nonlinear transformation image generated based on combined image data generated by combining the first image data, on which white balance control is performed based on a parameter corresponding to an external light component, and the flash-component image data, on which white balance control is performed based on a parameter corresponding to a flashlight component.

The nonlinear transformation used for the nonlinear transformation image may be gamma correction, and in the intensity-adjusting-value calculating step, the intensity adjusting value may be calculated as an adjusting value for reducing the number of pixels which have saturated values and which are included in a gamma correction image.

The intensity-adjusting-value calculating step may include a flash mask generating step of generating, from the flash-component image data, on which white balance control is performed based on a parameter corresponding to a flashlight component, a flash mask $M_f$ composed of pixels having values equal to or greater than a predetermined threshold value, and a gain calculating step of calculating gain g for adjustment by using the expression:

$$g=\{T^{-1}(\max-k\times \text{std}_{rslt})-\text{avg}_1\}/\text{avg}_F$$

where $T^{-1}$ represents the inverse transformation of nonlinear transformation T, max represents a maximum output pixel value, k represents a predetermined scalar value, $\text{avg}_1$ represents the average of luminances in a portion, which corresponds to the flash mask $M_f$, of white-balance-controlled image data $I_1'$ for the first image data, $\text{avg}_F$ represents the average of luminances in a portion, which corresponds to the flash mask $M_f$, of white-balance-controlled image data F' based on the flash-component image data, and $\text{std}_{rslt}$ represents the standard deviation of the values of pixels forming a portion, which corresponds to the flash mask $M_f$, of nonlinear-transformation image data $T(F'+I_1')$.

In the intensity-adjusted-flash-component-image calculating step, by using gain g for adjustment, intensity-adjusted-flash-component image data F" may be calculated based on the expression:

$$F''=gF'$$

where F' represents white-balance-controlled image data, and, in the finally-adjusted-image generating step, finally-adjusted image data R may be calculated based on the expression:

$$R=I_1+F''$$

where $I_1$ represents corrected image data $I_1$, and F" represents intensity-adjusted flash-component image data.

The image processing method may further include a motion detecting step of executing motion detection based on the first image data and third image data captured without flash emission, and the step of executing pixel-value correction on a moving portion detected in the motion detecting step.

The image processing method may further include an image capturing step of executing capturing of plural-image data including the first image data and the second image data by controlling flash emission.

According to another aspect of the present invention, an image processing apparatus is provided which includes a flash-component-image calculating unit for calculating flash-component image data based on first image data captured without flash emission and second image data captured with flash emission, an intensity-adjusting-value calculating unit for calculating an intensity adjusting value for the flash-component image data, an intensity-adjusted-flash-component-image calculating unit for calculating intensity-adjusted-flash-component image data by using the intensity adjusting value, and a finally-adjusted-image generating unit for generating finally-adjusted image data based on the first image data and the intensity-adjusted-flash-component image data.

Preferably, the flash-component-image calculating unit includes a differential image calculating unit for calculating differential image data representing differences between the first image data and the second image data, and a white balance control unit for executing white balance control on the differential image data based on a parameter corresponding to a flashlight component, and the intensity-adjusting-value calculating unit calculates the intensity adjusting value for the flash-component image data, on which the white balance control is performed.

The finally-adjusted-image generating unit may generate the finally-adjusted image data based on:

(a) white-balance-controlled first image data obtained by executing white balance control on the first image data based on a parameter corresponding to an external light component, and (b) intensity-adjusted-flash-component image data obtained by executing intensity adjustment on flash-component image data obtained by executing intensity adjustment based on a parameter corresponding to a flashlight component.

The intensity-adjusting-value calculating unit may calculate the intensity adjusting value as an adjusting value for reducing the number of pixels which have saturated values and which are included in a nonlinear transformation image generated based on combined image data generated by combining the first image data, on which white balance control is performed based on a parameter corresponding to an external light component, and the flash-component image data, on which white balance control is performed based on a parameter corresponding to a flashlight component.

The nonlinear transformation may be gamma correction, and the intensity-adjusting-value calculating unit may calculate the intensity adjusting value as an adjusting value for reducing the number of pixels which have saturated values and which are included in a gamma correction image.

The intensity-adjusting-value calculating unit may generate, from the flash-component image data, on which white balance control is performed based on a parameter corresponding to a flashlight component, a flash mask $M_f$ composed of pixels having values equal to or greater than a predetermined threshold value, and the intensity-adjusting-value calculating unit may calculate gain g for adjustment by using the expression:

$$g=\{T^{-1}(\max-k\times \mathrm{std}_{rslt})-\mathrm{avg}_1\}/\mathrm{avg}_F$$

where $T^{-1}$ represents the inverse transformation of nonlinear transformation T, max represents a maximum output pixel value, k represents a predetermined scalar value, $\mathrm{avg}_1$ represents the average of luminances in a portion, which corresponds to the flash mask $M_f$, of white-balance-controlled image data $I_1'$ for the first image data, $\mathrm{avg}_F$ represents the average of luminances in a portion, which corresponds to the flash mask $M_f$, of white-balance-controlled image data F' based on the flash-component image data, and $\mathrm{std}_{rslt}$ represents the standard deviation of the values of pixels forming a portion, which corresponds to the flash mask $M_f$, of nonlinear-transformation image data $T(F'+I_1')$.

The intensity-adjusted-flash-component-image calculating unit may calculate intensity-adjusted-flash-component image data F" by using gain g for adjustment on the basis of the expression:

$$F''=gF'$$

where F' represents a white-balance-controlled image, and the finally-adjusted-image generating unit may calculate finally-adjusted image data R based on the expression:

$$R=I_1+F''$$

where $I_1$ represents corrected image data $I_1$, and F" represents intensity-adjusted flash-component image data.

The image processing apparatus may further include a motion detecting unit for executing motion detection based on the first image data and third image data captured without flash emission, and a pixel-value correcting unit for executing pixel-value correction on a moving portion detected by the motion detecting unit.

The image processing apparatus may further include an image capturing unit for executing capturing of plural-image data including the first image data and the second image data by controlling flash emission.

According to another aspect of the present invention, a computer program for executing image processing is provided. The program includes a flash-component-image calculating step of calculating flash-component image data based on first image data captured without flash emission and second image data captured with flash emission, an intensity-adjusting-value calculating step of calculating an intensity adjusting value for the flash-component image data, an intensity-adjusted-flash-component-image calculating step of calculating intensity-adjusted-flash-component image data by using the intensity adjusting value, and a finally-adjusted-image generating step of generating finally-adjusted image data based on the first image data and the intensity-adjusted-flash-component image data.

A computer program of the present invention can be provided through a storage medium or communication medium provided in computer-readable form, for example, a storage medium such as CD, FD, or MO or a communication medium such as a network, for a multipurpose computer system capable of executing various types of program code. By providing this computer program in computer-readable form, processing in accordance with the program is implemented in the computer system.

According to the present invention, an image in which pixels, having saturated values, in an image obtained by nonlinear transformation, such as gamma correction, that is, overexposed highlights, are reduced can be generated. Therefore, the present invention is applicable to correction on images captured by, for example, a digital camera.

According to the present invention, optimal white balance control using a parameter corresponding to each image is executed. Therefore, the present invention is applicable to correction on images captured by, for example, a digital camera.

Further objects, features, and advantages of the present invention will become apparent from the following description of exemplary embodiments with reference to the attached drawings.

DESCRIPTION OF THE PREFERRED EMBODIMENTS

Figure 1:
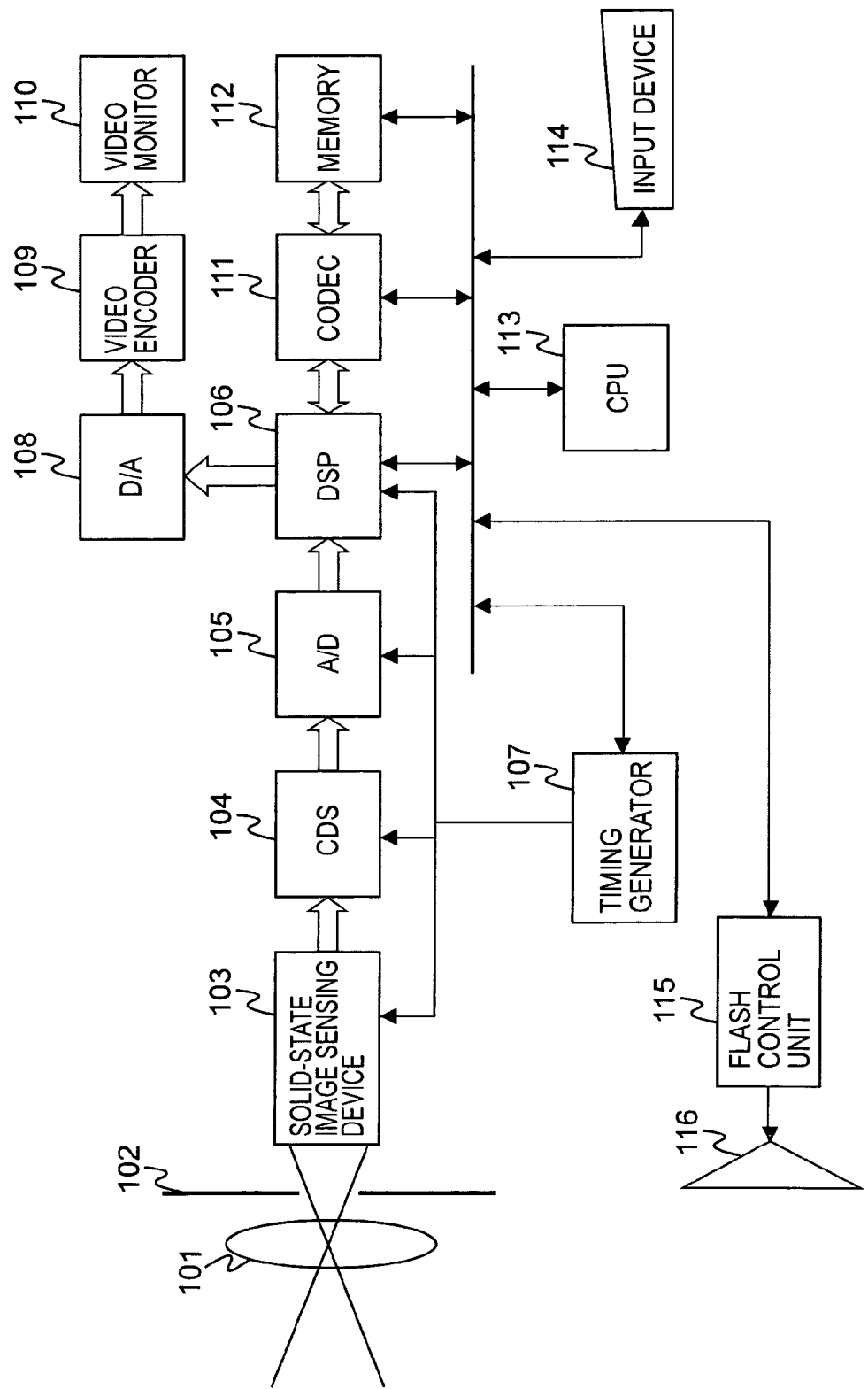
FIG. 1 is a block diagram showing the configuration of an image processing apparatus of the present invention.

Details of the present invention are described below with reference to the accompanying drawings. FIG. 1 shows an example of an image processing apparatus of the present invention. This image forming apparatus includes an imaging unit.

The image processing apparatus shown in FIG. 1 includes a lens 101, a diaphragm 102, a solid-state image sensing device 103, a correlated double sampling circuit (CDS) 104, an analog-to-digital (A/D) converter 105, a digital signal processing block 106, a timing generator 107, a digital-to-analog (D/A) converter 108, a video encoder 109, a video monitor 110, a coder/decoder (CODEC) 111, a memory 112, a central processing unit (CPU) 113, an input device 114, a flash control unit 115, and a flash emitter 116.

The input device 114 includes operation buttons such as recoding and other buttons. The digital signal processing block 106 is a functional block which has a signal processor and an image RAM, and in which programmed image processing can be performed on image data stored in the image RAM. The digital signal processing block 106 is hereinafter simply referred to as the "DSP 106".

The entire operation of the image processing apparatus is described below.

Incident light that reaches the solid-state image sensing device 103 after passing through an optical system firstly reaches photo-receiving elements on an imaging plane. The incident light is photoelectrically converted into an electrical signal by the photo-receiving elements. From the electrical signal, noise is eliminated by the CDS 104. The noise-eliminated signal is converted into a digital signal by the A/D converter 105, and is temporarily stored in the DSP 106. By using the flash control unit 115, the flash emitter 116 can be controlled to emit light at a shooting time, if needed.

In a shooting mode, the timing generator 107 controls a signal processing system so that image capturing can be maintained at a constant frame rate. A pixel stream is sent at a constant rate also to the DSP 106. The DSP 106 performs approximate image processing on the sent pixel stream to generate image data. The image data is sent to one or both of the D/A converter 108 and the CODEC 111. The D/A converter 108 converts the image data sent from the DSP 106 into an analog signal. The video encoder 109 converts the analog signal into a video signal. The video signal can be monitored by the video monitor 110. In this embodiment, the video monitor 110 serves as a camera finder. The CODEC 111 encodes the image data sent from the DSP 106. The encoded image data is stored in the memory 112. The memory 112 may be a recording unit using a recording medium such as a semiconductor recording medium, a magneto-optical recording medium, or an optical recording medium.

The above description is directed to the entirety of the image processing apparatus. Image processing for correcting the captured image is performed mainly by the DSP 106. Details of the image processing are described below.

The image processing is performed by sequentially executing, on an image signal stream input the DSP 106, processing described in predetermined program code. In the following description, in-program execution sequences of processes are described with reference to flowcharts. The present invention can be realized not only by the following program-executing form, but also by a hardware configuration having a function of executing a processing sequence (described below).

Figure 2:
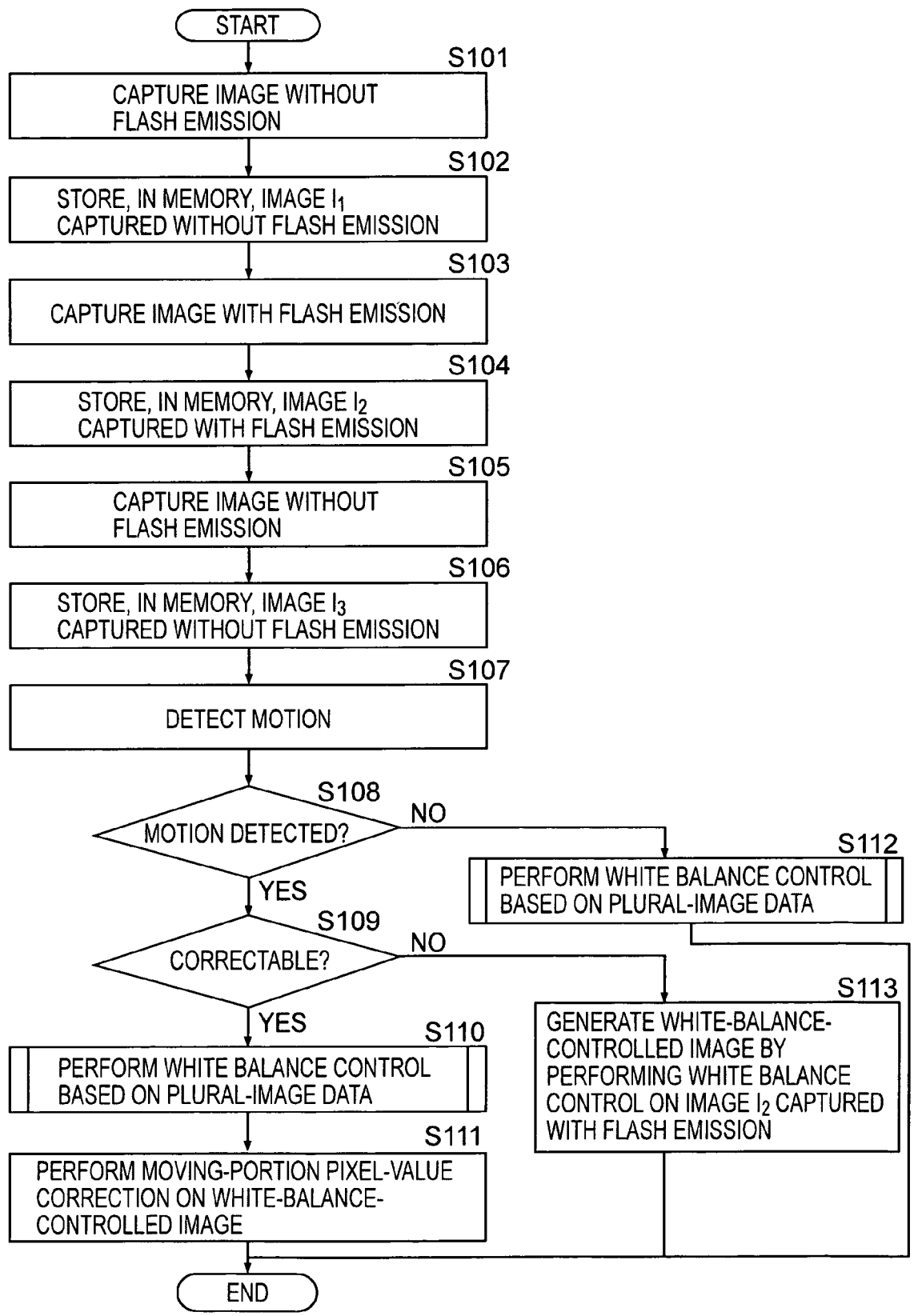
FIG. 2 is a flowchart illustrating a process of an image processing method of the present invention.

FIG. 2 is a flowchart illustrating a pixel value correcting process including a white balance control process which is executed by the DSP 106 on an input image signal stream.

In step S101, an image is captured without flash emission by using a preset stop and shutter speed. In step S102, the image captured with flash emission is stored as image data $I_1$ in a memory. In step S103, by using a preset stop and shutter speed similarly to the case of step S101, an image is captured with flash emission. In step S104, the image captured with flash emission is stored as image data $I_2$ in the memory.

In step S105, by using a preset stop and shutter speed similarly to the case of step S101, an image is captured again without flash emission. In step S106, the image captured without flash emission is stored as image data $I_3$ in the memory.

The image capturing in step S101, S103, and S105 is executed in the form of continuous shooting, for example, continuous shooting at intervals of $1/100$ seconds. The images obtained in the above steps are processed by pixel value correction such as white balance adjustment to generate finally adjusted images that are images having finally corrected pixels.

It is assumed that the images $I_1$, $I_2$, and $I_3$ stored in the memory be images corrected for blurring due to hand movement. In other words, when image blurring due to hand movement occurs at the time of capturing the three images $I_1$, $I_2$, and $I_3$, the image blurring is corrected before being stored in the memory. In other words, when a captured image has image blurring due to hand movement, between steps S101 and S102, between steps S103 and S104, or between steps S105 and S106, the image blurring due to hand movement is corrected and the corrected image is stored in the memory. Accordingly, the images $I_1$, $I_2$, and $I_3$ stored in the memory are similar to those continuously captured with the digital camera fixed to a camera tripod.

Conventionally known processes can be used as the correction of image blurring due to hand movement. The processes include, for example, a method that uses an acceleration sensor to detect a shift and shifts a lens, a method in which, by using an imaging element to capture an image having a resolution greater than an objective resolution, an appropriate portion is read so that a shift does not occur, and a method that corrects image blurring due to hand movement by only using image processing without using a sensor.

In step S107, it is determined whether image blurring caused by a subject itself has occurred during the time of capturing the three images in steps S101, S103, and S105. The determination of whether image blurring caused by a subject itself has occurred is performed by comparing two images from among the three images. For instance, by using the images $I_1$ and $I_3$, motion can be detected. By way of example, there is a method in which, after the difference in pixel value between the images $I_1$ and $I_3$ is detected, when the difference is equal to or greater than a threshold value, the pixel is registered as a moving portion. If it is determined that the image blurring caused by the subject itself has not occurred (No in step S108), the process proceeds to step S112. If it is determined that the image blurring caused by the subject itself has occurred (Yes in step S108), the process proceeds to step S109.

In step S109, it is determined whether correction for appropriate white balance adjustment can be performed for the moving portions detected in step S107. The determination uses a method of determination based on the ratio of the number of pixels registered as moving portions in step S107 to the number of pixels constituting the image. For example, when the ratio [ratioA] of the number of pixels registered as moving portions to the number of pixels constituting the image is equal to or greater than predetermined constant threshold value [Threshold], it is determined that the correction cannot be performed. Conversely, when ratio [ratioA] is less than the threshold value, it is determined that the correction can be performed.

If, in step S109, it is determined that the correction cannot be performed, the process proceeds to step S113. If, in step S109, it is determined that the correction can be performed, the process proceeds to step S110.

In step S113, by performing white balance control on the image $I_2$ captured with flash emission, an output image R is generated and the process ends. A parameter for use in white balance control is one of a parameter set in accordance with an external light component, a parameter set in accordance with a flashlight component, a parameter set based on an intermediate component between external light and flash light. White balance control in which one of the above parameter is set is executed. The white balance control is a method that has conventionally been performed. Accordingly, its detailed description is omitted. The parameter for use is represented by a 3 by 3 matrix. This matrix is used for converting a color component forming the color of each pixel. As the 3 by 3 matrix, a matrix in which those other than diagonal components are set to zeroes is used.

In step S110, the process executes pixel value correction including white balance control based on plural-image data. In step S110, the values of pixels excluding the moving portions detected in the moving portion detection in step S107 are only corrected. In step S111, the pixel values of the moving portions are corrected. Alternatively, in step S110, for all the pixels, pixel value correction including white balance control may be executed, and in step S111, correction of only pixels as the moving portions may be executed.

The correction of the values of pixels as the moving portions in step S111 is executed by, for example, a process to which a radial basis function is applied, a process to which a smoothing filter is applied, or the like. Details of these processes are described in Japanese Patent Application No. 2003-312630 whose applicant is identical to the assignee of the present invention.

The white balance control based on plural-image data in each of steps S110 and S112 is described below.

Steps S110 and S112 are identical to each other. In other words, in step S112, when no motion is detected in the motion detection in step S107, pixel value correction is executed for the entirety of the image. In step S110, correction of the values of pixels excluding the moving portions detected in step S107, or correction of the values of all the pixels is executed in the same processing sequence. Details of each of steps S110 and S112 are described below with reference to FIG. 3.

In step S201, the difference in each color component (e.g., in each of R, G, and B channels) between the image $I_2$ captured with flash emission and the image $I_1$ captured without flash emission is detected to generate a differential image F ($=I_2-I_1$). The differential image F ($=I_2-I_1$) is stored as a flash component image in the memory. Assuming that the subject does not move during the time between step S101 in which the image is captured without flash emission and step S103 in which the image is captured with flash emission, the differential image F ($=I_2-I_1$) is equivalent to an image captured such that, in a state completely free from external light, only flash emission is directed onto a subject and light reflected by the subject is incident on the solid-state imaging device of the camera, that is, a flash component image.

In step S202, for the differential image F, white balance control in accordance with the color temperature of flash emission is executed. In other words, white balance control on the differential image F, which is a flashlight component image, is executed based on a parameter set in accordance with a flashlight component is executed. In addition, when the flash emission is too bright or too dark, level adjustment is performed so that image luminance is optimal, whereby a corrected differential image F' is generated as a corrected flash component image.

In step S203, white balance control on the image $I_1$ captured without flash emission is executed in accordance with external light. In other words, based on a parameter corresponding to an external light component, white balance control on the image $I_1$ captured without flash emission is executed to generate a corrected image $I_1'$.

This is executed by white balance control that has conventionally been known. For example, the technology described in Japanese Unexamined Patent Application Publication No. 2001-78202 can be applied. In Japanese Unexamined Patent Application Publication No. 2001-78202, based on the differential image F between the image $I_2$ captured with flash emission and the image $I_1$ captured without flash emission, and known spectral characteristics, object color component data and an external light spectral distribution are found as lighting component data. By using the lighting component data to execute white balance control on the image $I_1$ captured with flash emission, corrected image I' is generated.

In step S204, by adjusting the intensity (gain) of the corrected differential image F', obtained by performing correction when the flash emission is too bright or too dark so that a final image has an optimal luminance, an intensity-adjusted difference image F''' is generated as a gain-adjusted flash component image.

An overview of a process for generating the intensity-adjusted difference image F''' is as follows:

By finding an optimal gain of the corrected differential image F' by using a statistic such as a histogram based on the corrected differential image F', the corrected image $I_1'$, and pixel values of these images, and a statistic concerning an image obtained by performing nonlinear transformation, such as gamma correction, on a combined image "F'+$I_1'$", the intensity-adjusted difference image F''' is generated as a gain-adjusted flash component image having an adjusted luminance.

The process for generating the intensity-adjusted difference image F''' (gain-adjusted flash component image F'''), executed in step S204, is described below with reference to the flowchart shown in FIG. 4.

In step S301, a flash mask $M_f$ is generated based on the corrected differential image F', in which white balance control has been performed. The flash mask $M_f$ represents an image part in which it is considered that an image of an object is captured in a state receiving flash emission. An example of a specific method for generating the flash mask $M_f$ is described below.

At first, in the corrected differential image F', pixels having luminances equal to or greater than a preset threshold value (Th1) are detected. The average of the luminances of the detected pixels having luminances equal to or greater than the threshold value (Th1) is calculated. When the luminances of the detected pixels constituting the corrected differential image F' are greater than the calculated average, it may be said that part of the corrected differential image F' will greatly affect a final image in which an external light effect and a flash emission effect are combined.

Regarding the pixels corresponding to the motion of the subject which are detected in step S107 described with reference to FIG. 2, there is a possibility that the motion appears as a flash component. Accordingly, the pixels detected in step S107 are excluded from pixels subject to flash mask setting. The correction of the pixel values of the moving portions is executed in step S111 shown in FIG. 2.

In other words, a flash mask composed of pixel regions satisfying two conditions is generated as the flash mask $M_f$. The two conditions are as follows:
(a) pixels, in the corrected differential image F', having luminances greater than a predetermined threshold value; and
(b) pixels that do not correspond to moving portions of the image of the subject itself.

In step S302 and thereafter, by analyzing a part of the image which corresponds to the flash mask $M_f$ composed of pixel regions satisfying the conditions (a) and (b), and calculating the optimal gain g of the corrected differential image F', gain-adjusted differential image F'' is found in the form of $$F''=gF'$$

Steps S302 and thereafter are described below with reference to FIGS. 5, 6, and 7.

In step S302, average luminances of the corrected differential image F' and the portion of the flash mask $M_f$ in the corrected image $I_1$ are calculated.

Figure 5:
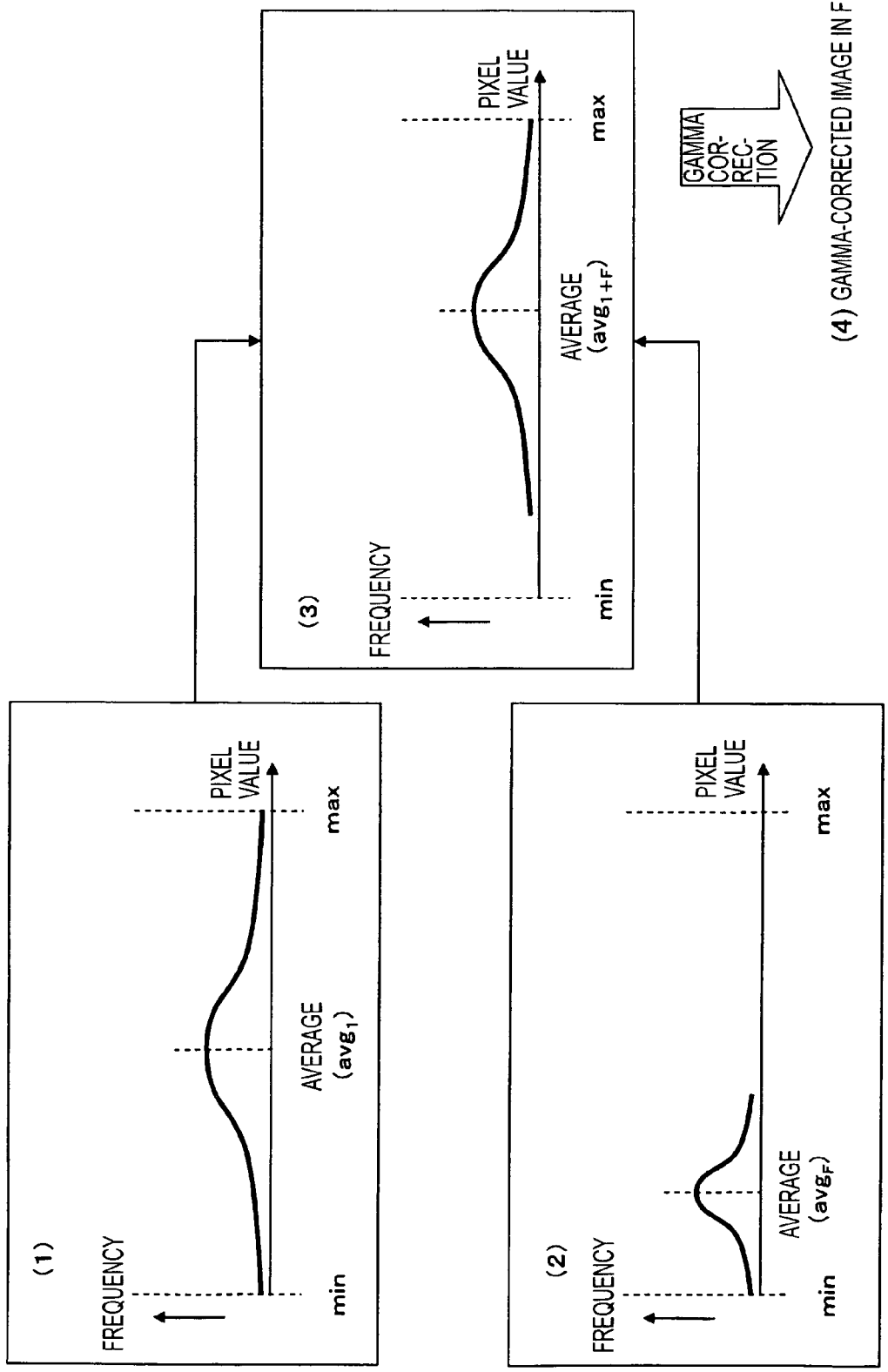
FIG. 5 is an illustration of details of the process in the image processing method for generating an intensity-adjusted flash-component image.

Part (1) of FIG. 5 shows a frequency distribution graph representing the frequency of luminances (pixel values) in the portion of the flash mask $M_f$ in the corrected image $I_1'$. In this graph, the horizontal axis indicates pixel values and the vertical axis indicates the corresponding frequencies. Each pixel value represents, for example, a luminance between 0 (minimum) and 255 (maximum). Although one graph is used for description for brevity of description, in the case of an RGB color image, for example, graphs corresponding to RGB channels are generated and the following process is executed for each channel.

The luminances (pixel values) of the pixels forming the portion of the flash mask $M_f$ in the corrected image $I_1'$ are distributed between a minimum value, for example, 0, to a calculating the optimal gain g of the corrected differential image F', gain-adjusted differential image F'' is found in the form of $$F''=gF'$$

Steps S302 and thereafter are described below with reference to FIGS. 5, 6, and 7.

In step S302, average luminances of the corrected differential image F' and the portion of the flash mask $M_f$ in the corrected image $I_1$ are calculated.

Part (1) of FIG. 5 shows a frequency distribution graph representing the frequency of luminances (pixel values) in the portion of the flash mask $M_f$ in the corrected image $I_1'$. In this graph, the horizontal axis indicates pixel values and the vertical axis indicates the corresponding frequencies. Each pixel value represents, for example, a luminance between 0 (minimum) and 255 (maximum). Although one graph is used for description for brevity of description, in the case of an RGB color image, for example, graphs corresponding to RGB channels are generated and the following process is executed for each channel.

The luminances (pixel values) of the pixels forming the portion of the flash mask $M_f$ in the corrected image $I_1'$ are distributed between a minimum value, for example, 0, to a maximum value, for example, 255. The average (hereinafter referred to as "$avg_1$") of the luminances in the portion of the flash mask $M_f$ in the corrected image $I_1'$ is indicated by "AVERAGE ($avg_1$)".

Part (2) of FIG. 5 shows a frequency distribution graph representing the frequency of luminances (pixel values) in the portion of the flash mask $M_f$ in the corrected differential image F'. The average of the luminances (pixel values) of pixels forming the portion of the flash mask $M_f$ in the corrected differential image F' is indicated by "AVERAGE ($avg_F$)".

Figure 4:
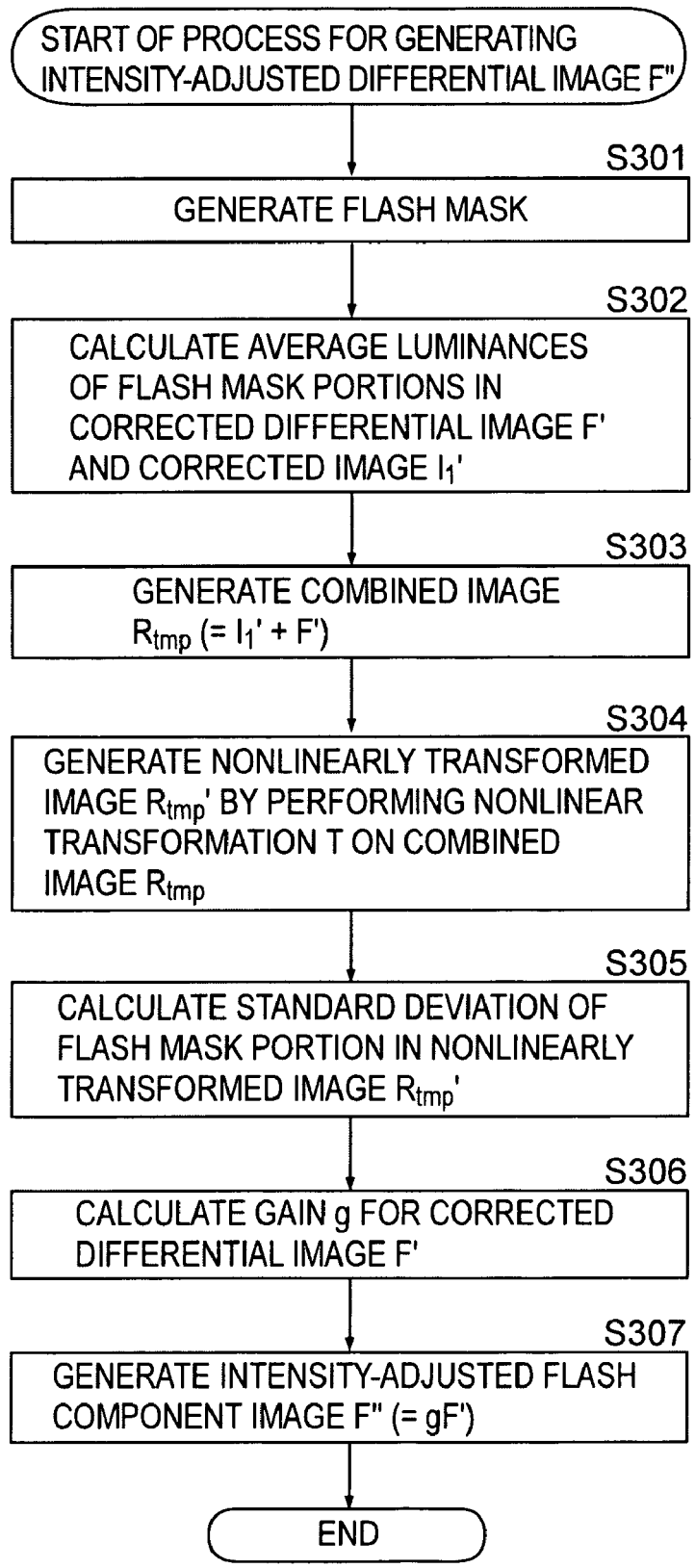
FIG. 4 is a flowchart illustrating a process in the image processing method for generating an intensity-adjusted flash-component image.

In the step 302 shown in FIG. 4, by generating the frequency distribution graphs, the averages in the frequency distribution graphs, that is, the average $avg_1$ of luminances (pixel values) in the portion of the flash mask $M_f$ in the corrected image $I_1'$, and the average $avg_F$ of luminances (pixel values) in the portion of the flash mask $M_f$ in the corrected differential image F', are calculated.

In step S303, a combined image $R_{tmp}$ ($=I_1+F'$) obtained by combining the corrected image $I_1'$ and the corrected differential image F' is generated. The combined image $R_{tmp}$ is generated by adding, to the values of pixels of the corrected image $I_1'$, the values of the corresponding pixels of the corrected differential image F'.

Part (3) of FIG. 5 shows a frequency distribution graph representing the frequency of luminances (pixel values) of the portion of the flash mask $M_f$ in the combined image $R_{tmp}$ ($=I_1'+F'$) obtained by combining the corrected image $I_1'$ and the corrected differential image F'. The luminances (pixel values) of pixels forming the portion of the flash mask $M_f$ in the combined image $R_{tmp}$ ($=I_1'+F'$) are set so as to be entirely shifted to a maximum pixel value. The average of luminances in the portion of the flash mask $M_f$ in the combined image $R_{tmp}$ ($=I_1'+F'$) is indicated by "AVERAGE ($avg_{1+F}$)".

The luminances of pixels forming an image output from the solid-state image sensing device 103 have a linear relationship with the amount of light incident on the solid-state image sensing device 103. An image that is output as a final image by a common digital still camera is such that nonlinear transformation, such as gamma correction, is performed on an image output from a solid-state sensing device. Gamma correction is a correcting process for display an accurate luminance of an image and an accurate chroma of color. When pixels obtained by using a digital still camera to capture an image are output without being changed, the pixels may become unnatural when being observed through human eyes. To solve this problem, by using a predetermined gamma curve, input pixel values and output pixel values are nonlinearly transformed. This is called "gamma correction".

This nonlinear transformation is hereinafter indicated by "T". In step S304, an image, represented by $R_{tmp}$ ($=I_1+F'$), in which the combined image $R_{tmp}$ ($=I_1+F'$) of the corrected image $I_1'$ and the corrected differential image F' is nonlinearly transformed is generated.

The nonlinearly transformed image $R_{tmp}'$ ($=T(F'+I_1')$) represents a nonlinearly transformed image obtained by performing nonlinear transformation T on pixel values on each channel of each pixel of the combined image $R_{tmp}$ ($=F'+I_1'$), for example, each of RGB channels.

Figure 6:
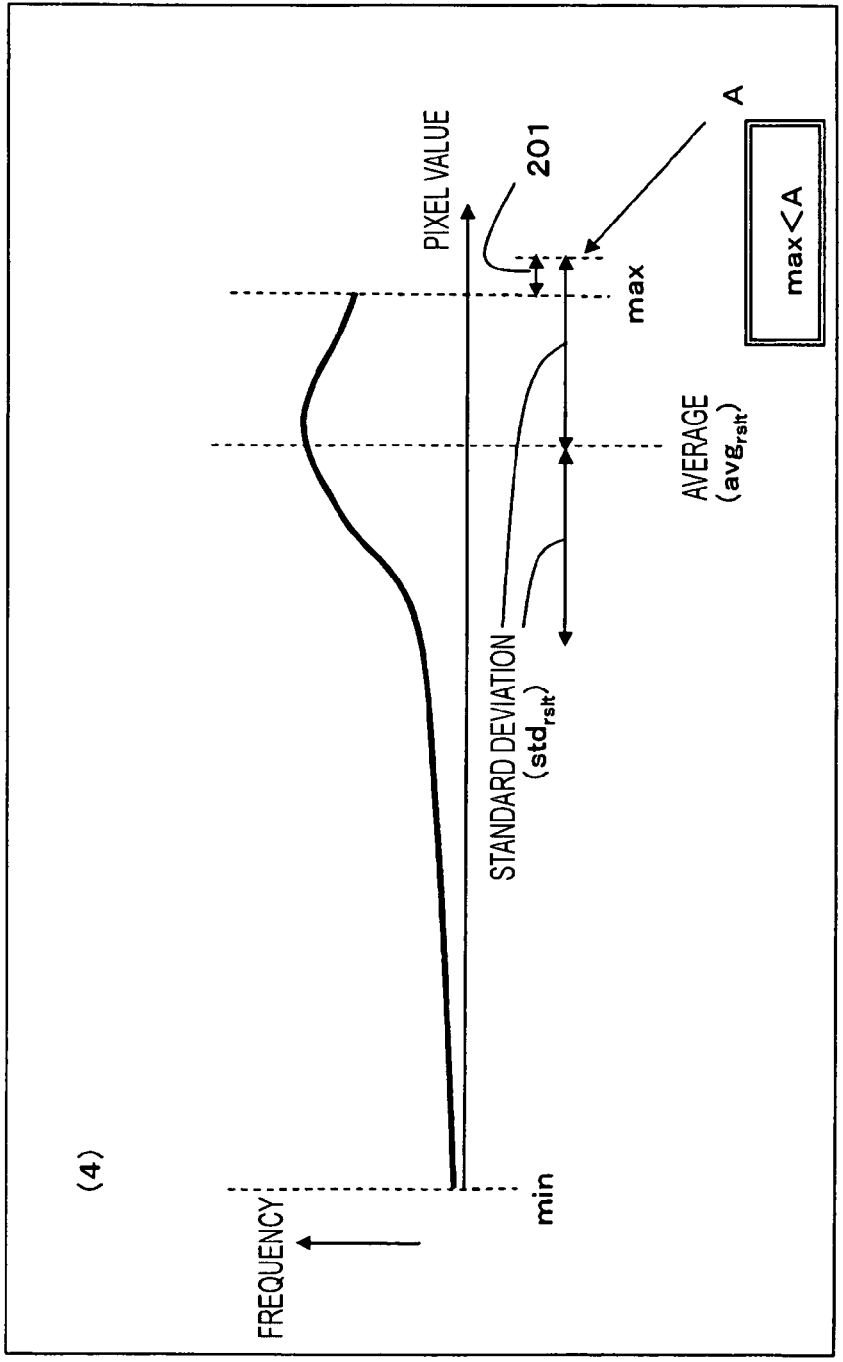
FIG. 6 is an illustration of details of the process in the image processing method for generating an intensity-adjusted flash-component image.

FIG. 6 is a frequency distribution graph showing the frequency of luminances (pixel values) in the portion of the flash mask $M_f$ in a nonlinearly transformed image $T(F'+I_1')$ obtained by performing nonlinear transformation T on pixels on each channel of pixels of a combined image $(F'+I_1')$ of the corrected image $I_1'$ and corrected differential image F' shown in part (3) of FIG. 5. The luminances (pixel values) of pixels forming the portion of the flash mask $M_f$ in a linearly transformed image $T(F'+I_1')$ are set to be entirely shifted to a maximum pixel value.

In step S305, a standard deviation is calculated from the frequency distribution graph shown in FIG. 6. The average of values of pixels forming the portion of the flash mask $M_f$ in the linearly transformed image $T(F'+I_1')$ is indicated by "AVERAGE ($avg_{rslt}$)", as shown in FIG. 6. In addition, the standard deviation is found as "$std_{rslt}$".

As shown in FIG. 6, in the frequency distribution graph including the values of pixels forming the portion of the flash mask $M_f$ in the linearly transformed image $T(F'+I_1')$, many pixel values are distributed around a maximum, for example, a pixel value of 255. Accordingly, it can be found that an overexposed highlight appears. Pixels of the overexposed highlight are indicated by the overexposed highlight 201 shown in FIG. 6. In other words, gamma correction sets the values of pixels to the maximum (maximum luminance), that is, a saturated pixel value. This state is a so-called "overexposed highlight state" in which original differences in pixel values cannot be represented.

An ideal image is sufficiently bright and free from an overexposed highlight state. An image having many saturated pixel values as shown in FIG. 6, which are caused by gamma correction, has a feature of an ideal image.

Therefore, in the present invention, gain g for adjustment is calculated as an adjusting value that reduces the number of pixels which have saturated values and which are included in a nonlinear transformation image generated based on a combined image based on the corrected image $I_1$ obtained by executing white balance control based on a parameter based on an external light component and the corrected differential image F' obtained as a flash component image by executing white balance control based on a flashlight component. By using the calculated gain g, the corrected differential image F' is corrected to generate an intensity-adjusted flash-component image.

As described above, in the present invention, by performing virtual adjustment on the gain of flash emission by adjusting the gain g of the corrected differential image F', a final image (finally-adjusted image) is generated.

In step S306, an image that is bright and free from an overexposed highlight state is generated as a finally-adjusted image. Thus, by using the average $avg_1$ of luminances in the portion of the flash mask $M_f$ in the corrected image $I_1'$ shown in part (1) of FIG. 5, the average $avg_F$ of luminances in the portion of the flash mask $M_f$ in the corrected differential image F' shown in part (2) of FIG. 5, and the standard deviation $std_{rslt}$ of pixels forming the portion of the flash mask $M_f$ in the linear transformation image $T(F'+I_1')$ shown in FIG. 6, optimal gain g of the corrected differential image F' is calculated. In step S307, by multiplying the values of pixels on each channel of the corrected differential image F' by gain g, an intensity-adjusted difference image F" is generated. In other words, the intensity-adjusted difference image F" is found by using the expression:

$$F''=gF'$$

In general, when measured pixel values are distributed in accordance with the normal distribution, approximately 68% of the measured pixel values exist in the range of the "average"±the "standard deviation", and approximately 95% of the measured pixel values exist in the range of the "average"±the "double the standard deviation". Also in a case in which the pixel value distribution is not in accordance with the normal distribution, a similar tendency can be found.

Accordingly, when many overexposed highlights appear as shown in the pixel value histogram in FIG. 6 of pixels forming the portion of the flash mask $M_f$ in the linear transformation image $T(F'+I_1')$, in many cases, the sum of the average and standard deviation of the luminances in the portion of the flash mask $M_f$, that is, the value indicated by the point A shown in FIG. 6 is greater than the maximum pixel value.

In calculation of gain g for the corrected differential image F' in step S306, gain g is set so that the range of the "average"±"k times the standard deviation" (k represents a predetermined fixed scalar value, e.g., 1, 1.5, 2, ...) found from the pixel value histogram of the pixels forming the portion of the flash mask $M_f$ in the linear transformation image $T(F'+I_1')$ is not greater than the maximum pixel value and represents sufficient luminance.

Figure 7:
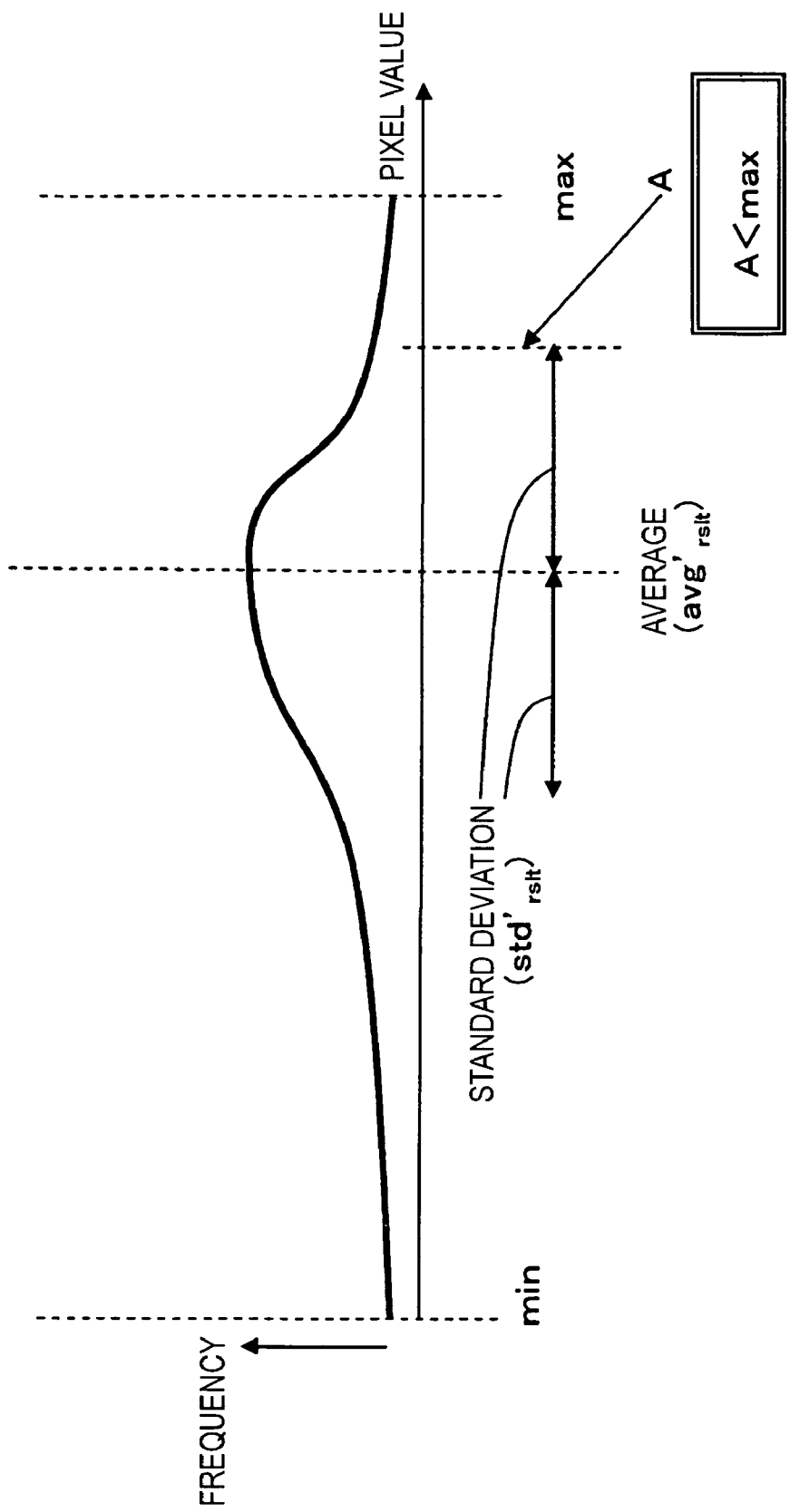
FIG. 7 is a graph illustrating details of the process in the image processing method for generating an intensity-adjusted flash-component image.

It is possible that a histogram representing an ideal image having no overexposed highlight or a small overexposed highlight be as shown in, for example, FIG. 7.

By setting the histogram of luminances in the portion of the flash mask $M_f$ in the intensity-adjusted nonlinear transformation image $T(gF'+I_1')$ to be in the form shown in FIG. 7, and generating a final output image based on the intensity-adjusted nonlinear transformation image $T(gF'+I_1')$, an ideal image free from an overexposed highlight and having sufficient luminance can be obtained.

The average in the histogram shown in FIG. 7 is indicated by "$avg'_{rslt}$", and the standard deviation in this histogram is indicated by "$std'_{rslt}$".

The point A, represented by the sum of the average and the standard deviation, represents a pixel value that is less than the maximum value shown in FIG. 7. The average "$avg'_{rslt}$" represents a pixel value representing sufficient luminance. Average $avg'_{rslt}$ is, for example, greater in pixel value (luminance) than intermediate pixel value represented by "(the minimum+the maximum)/2".

Here, it is assumed that the histogram shown in FIG. 7 be a luminance histogram concerning the portion of the flash mask $M_f$ in the intensity-adjusted nonlinear transformation image $T(gF'+I_1')$.

In this embodiment, in order for the portion of the flash mask $M_f$ in the intensity-adjusted nonlinear transformation image $T(gF'+I_1')$ to have a small number of overexposed highlights and sufficient luminance, gain g is adjusted so that the average $avg'_{rslt}$ in the luminance histogram (FIG. 7) in the portion of the flash mask $M_f$ in the intensity-adjusted nonlinear transformation image $T(gF'+I_1')$ is equivalent to a value obtained by subtracting a value k times the standard deviation $std'_{rslt}$ from the maximum luminance.

The portion of the flash mask $M_f$ in the intensity-adjusted nonlinear transformation image $T(gF'+I_1')$ generated by using gain g is a partial image having a small number of overexposed highlights and sufficient luminance.

In a case in which this gain g that generates an optimal image is calculated, when the gain g is not extremely great or small, it is regarded that there is no large difference between the standard deviation of luminances in the portion of the flash-mask $M_f$ in the nonlinear transformation image $T(F'+I_1')$ and the standard deviation of luminances in the portion of the flash mask $M_f$ in the intensity-adjusted nonlinear transformation image $T(gF'+I_1')$. It is assumed that the histogram shown in FIG. 7, that is, the standard deviation $std'_{rslt}$ in the luminance histogram of the portion of the flash mask $M_f$ in the intensity-adjusted nonlinear transformation image $T(gF'+I_1')$ be identical in size to the histogram shown in FIG. 6, that is, the standard deviation in the luminance histogram of the portion of the flash mask $M_f$ in the nonlinear transformation image $T(F'+I_1')$ in a state before intensity adjustment. In other words, $std'_{rslt}=std_{rslt}$.

It is assumed that scalar value, represented by "$T(avg_1+g \times avg_F)$", calculated by performing nonlinear transformation T on the sum "$avg_1+avg_F$" of the average "$avg_1$" in the histogram shown in part (1) of FIG. 5 concerning the corrected image $I_1$ and the average " " of luminances in the portion of the flash mask $M_f$ in the corrected differential image F' obtained by using gain g, be equivalent to the average "$avg'_{rslt}$" of luminances in the portion of the flash mask $M_f$ in the final intensity-adjusted nonlinear-transformation image represented by "$fF'+I_1'$". In other words, it is assumed that $avg'_{rslt}=T(avg_1+g \times avg_F)$.

In other words, the average $avg'_{rslt}$ of the intensity-adjusted nonlinear-transformation image $T(gF'+I_1')$ to be found is equal to $T(avg_1+g \times avg_F)$. When this value is equal to (max−$k \times std_{rslt}$), an image corresponding to the histogram shown in FIG. 7 is set. As a result, a histogram according to an image having a small number of overexposed highlights and sufficient luminance is formed.

In other words, $$T(avg_1+g \times avg_F)=max-k \times std_{rslt} \quad (1)$$

Gain g that satisfies expression (1) only needs to be calculated. The following expression (2) obtained by transforming expression (1) is used as an expression for calculating gain g.

$$g=\{T^{-1}(max-k \times std_{rslt})-avg_1\}/avg_F \quad (2)$$

where $T^{-1}$ represents the inverse transformation of nonlinear transformation T.

In step S306 in FIG. 4, based on expression (2), gain g is calculated as a gain-adjusting value for a flash component image (corrected differential image F').

As can be understood from expression (2), gain g can be calculated based on each of:
a) the average $avg_1$ of luminances in the portion of the flash mask $M_f$ in the corrected image $I_1'$ shown in part (1) of FIG. 5;
b) the average $avg_F$ of luminances in the portion of the flash mask $M_f$ in the corrected differential image F';
c) the standard deviation $std_{rslt}$ of values of pixels forming the portion of the flash mask $M_f$ in the nonlinear transformation image $T(F'+I_1')$; and
d) fixed scalar value k.

Fixed scalar value k is a preset value such as k=1 or k=1.5.

In step S307, by multiplying the value on each channel of each pixel of the corrected differential image F' by gain g, the intensity-adjusted difference image F" is calculated. This is expressed by the following expression:

$$F''=gF'$$

The calculated intensity-adjusted difference image F" is set as a flash component image for use in generating a finally adjusted image.

Figure 3:
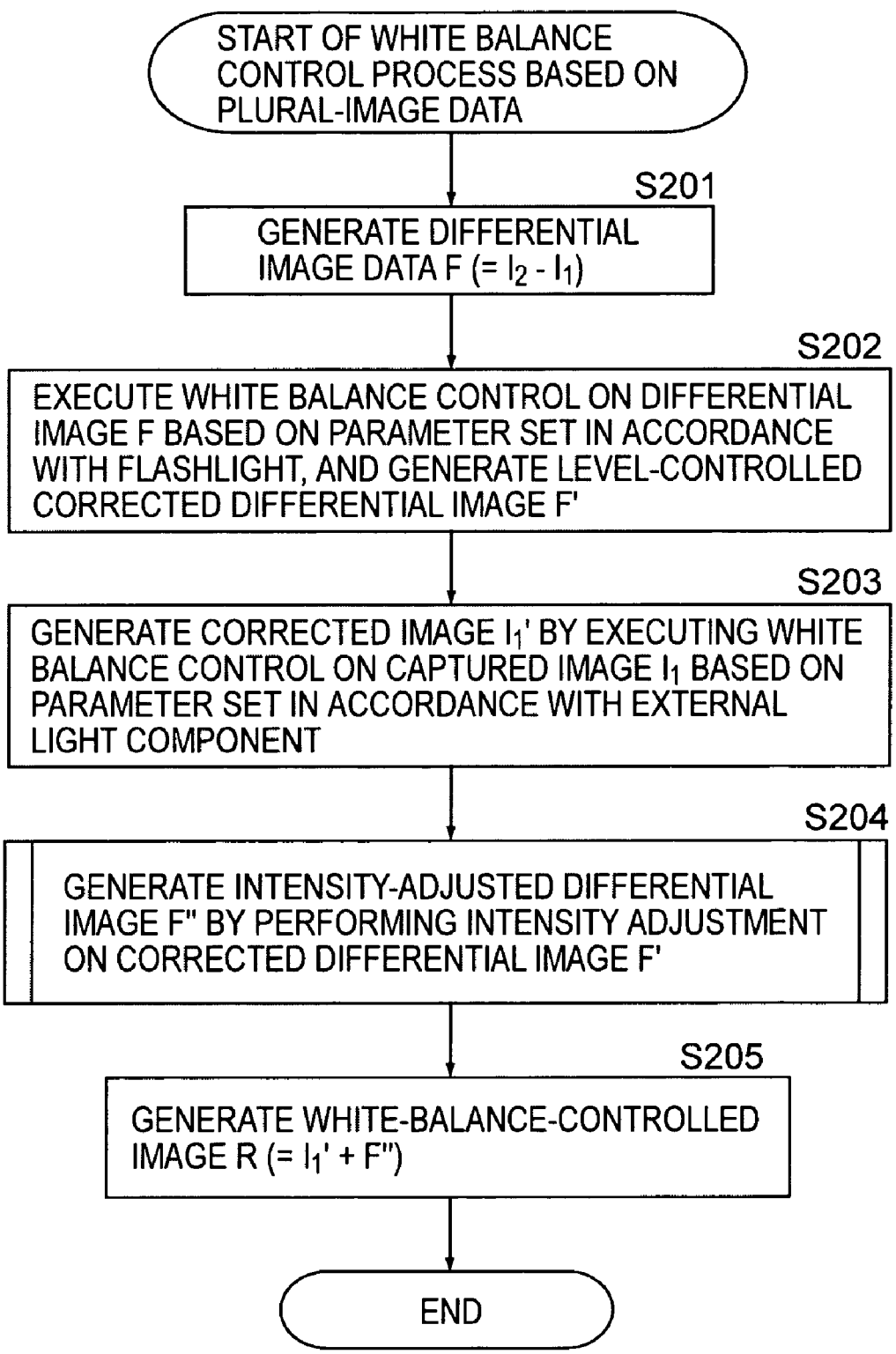
FIG. 3 is a flowchart illustrating a white balance control process based on plural-image data in the image processing method of the present invention.

The processing that has been described is performed in the step S204 shown in FIG. 3. Automatic calculation of gain g has been described. However, gain g can be freely set by the user to adjust desired intensity of flash emission.

After finishing step S204, in step S205, by combining the intensity-adjusted difference image F" and image $I_1'$ set as flash component images, a white-balance-controlled image R is generated. In other words, the white-balance-controlled image R is generated such that $R=I_1'+F''$.

The above processing is details of the steps S112 and S110 shown in FIG. 2.

When, in step S107, no motion is detected, the white-balance-controlled image R, obtained by combining the intensity-adjusted difference image F" obtained as a flash component image and the image $I_1'$, is used as a finally-adjusted image. This is expressed by $R=I_1'+F''$. Nonlinear transformation processing, such as gamma correction, is performed on the finally-adjusted image, and the processed image is output.

When, in step S107, motion is detected, the white-balance-controlled image R obtained in step S110, represented by $R=I_1'+F''$, is acquired. Subsequently, in step S111, pixel value correction on the moving portion is executed. The moving-portion pixel-value correction in step S111 is executed by processing such as processing to which the radial basis function described in Japanese Patent Application No. 2003-312630 whose applicant is identical to the assignee of the present invention, as described above, or processing to which a smoothing filter is applied.

When, in step S107, motion is detected, in step S111, an image in which pixel values in a moving portion are corrected is used as a finally-adjusted image.

In the pixel value correction in step S110, all the pixels forming the image are corrected regardless of a distinction between pixels in the moving portion and pixels in the other portions, and the white-balance-controlled image R, represented by $R=I_1'+F''$, is generated in step S110. Subsequently, in step S111, exceptional correction only on the pixel values (in the moving portion) detected in step S107 may be executed to correct the white-balance-controlled image R. Specifically, a method that performs receiving pixel values in the moving portion of the image $I_2$ captured with flash emission, referring to pixel values in a non-moving portion in the image R, and combining images to generate a final image can be used.

Figure 8:
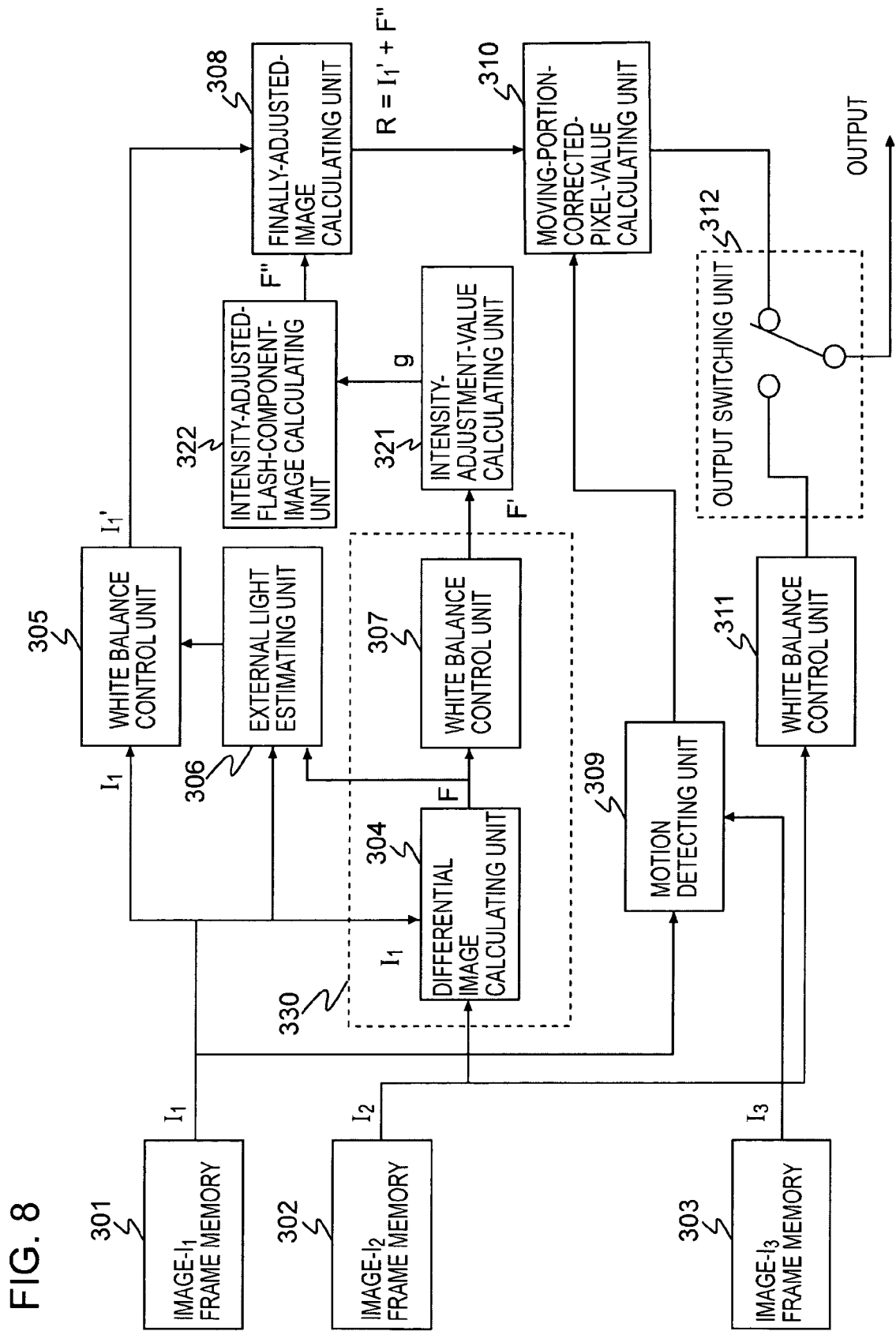
FIG. 8 is a block diagram showing a pixel value adjusting process based on plural-image data in image processing of the present invention.

FIG. 8 is a block diagram showing the functional configuration of a digital signal processor (DSP) (corresponding to the DSP 106 shown in FIG. 1) that executes processing in accordance with this embodiment.

A process of the DSP shown in FIG. 8 is described below in comparison with the flowchart shown in FIG. 2.

The image $I_1$ captured without flash emission, the image $I_2$ captured with flash emission, and the image $I_3$ without flash emission, in steps S101 to S106, are stored in frame memories 301, 302, and 303, respectively. As a frame memory for storing images, a built-in memory of the DSP, or a bus-connected memory (the memory 112 shown in FIG. 1) may be used.

The motion detection in step S107 is executed in a motion detecting unit 309. The motion detection is executed as detecting processing based on differential data based on the image $I_1$ captured without flash emission and the image $I_3$ captured without flash emission.

The white balance control based on plural-image data, executed in each of steps S110 and S112, is the processing already described with reference to FIGS. 3 and 4.

Based on the image $I_1$ captured without flash emission and the image $I_2$ captured with flash emission, differential image data, represented by $F=I_2-I_1$, is calculated in a differential image calculating unit 304 in a flash component image calculating section 330 (FIG. 3, S201). Next, a corrected differential image F' is generated (FIG. 3, S202) as a flash component image corrected by executing white balance control, in accordance with parameters set based flash components in a white balance control unit 307, on the differential image data F, which corresponds to an image captured on an illumination condition of only flash emission.

A white balance control unit 305 executes white balance control, in accordance with parameters set based on an estimated value of the external light obtained in an external light estimating unit 306, on the image I1 captured without flash emission (FIG. 3, S203).

An intensity-adjustment-value calculating unit 321 calculates gain g as an adjustment value for preventing the corrected differential image F' from having no overexposed highlight or a small number of overexposed highlights. An intensity-adjusted-flash-component-image calculating unit 322 calculates an intensity-adjusted flash component image, represented by F''=gF'. This processing is step S203 in FIG. 3, that is, the processing in accordance with the flowchart shown in FIG. 4.

A finally-adjusted-image calculating unit (pixel value adder) 308 adds the pixel values of the corrected image $I_1'$ output from the white balance control unit 305 and the pixel values of the intensity-adjusted difference image F'' output from the intensity-adjusted-flash-component-image calculating unit 322 (FIG. 3, S205).

When the captured image includes no moving portion, image data having the pixel values added in the finally-adjusted-image calculating unit 308 is output as a white-balance-controlled image through an output switching unit 312 without executing processing in a moving-portion-corrected-pixel-value calculating unit 310. The image data is output to a D/A converter 108 (see FIG. 1), a codec 111 for executing encoding, etc.

In addition, when, in step S309, a moving portion of the subject itself is detected as the result of motion detection using the differential data based on the image I1 captured without flash emission and the image $I_3$ captured without flash emission, in the moving-portion-corrected-pixel-value calculating unit 310, pixel values of the moving portion are corrected (transformed) by performing processing such as processing to which a radial basis function is applied, or processing using a smoothing filter, and an image in which the moving portion is replaced by the corrected pixel values is output through the output switching unit 312.

The white balance control unit 311 executes step S113 in the flowchart shown in FIG. 2. In other words, when it is determined that correction is impossible, such as a case in which, although the moving portion is detected by the motion detecting unit 309, the ratio of the moving portion to the entire image is high, by inputting the image $I_2$ captured with flash emission, and executing white balance control in accordance with a predetermined parameter, the generated image is output through the output switching unit 312.

Although, in the configuration shown in FIG. 8, processing units are separately shown for describing functions, in actual processing, the functions are executable by a built-in processor in the DSP in accordance with a program for executing processing in accordance with the above-described flowcharts.

The present invention has been fully described with reference to specific embodiments. However, it is obvious that a person skilled in the art can correct or substitute the foregoing embodiment without departing from the gist of the present invention. In other words, the present invention has been disclosed in exemplified form. Accordingly, the present invention should not be interpreted in limited sense. To comprehend the gist of the present invention, the appended claims should be considered.

Although, in the foregoing embodiment, a lighting device that emits light when a subject is in the dark is described as the term "flash", it may be called a "strobe". Accordingly, it is not limited to the flash. The present invention is applicable to common lighting devices that emit light when a subject is in the dark.

Consecutive processing described in this specification can be executed by hardware, software, or a combination of both. In the case of using software to execute processing, the processing can be executed by installing, into a memory in a computer built into dedicated hardware, a program in which a processing sequence is recorded, or installing the program into a multipurpose computer capable of various types of processing.

For example, the program can be recorded in a hard disk or read-only memory (ROM) as a recording medium. Alternatively, the program can be temporarily or eternally stored (recorded) in a removable recording medium such as a flexible disk, CD-ROM, a magneto-optical disk, a digital versatile disk (DVD), a magnetic disk, or a semiconductor memory. This type of removable recording medium can be provided as so-called "package software".

The program can be installed from the above removable recording medium into a computer. In addition, the program can be transferred to the computer by radio, or can be transferred to the computer through a network such as the Internet by wire. The computer can receive and install the program transferred in the above manner in a built-in recording medium such as a hard disk.

The processing steps described in this specification are not only executed in a time-series manner in accordance with the description, but also may be executed in parallel or separately in accordance with the processing capability of an apparatus that executes the steps or as required. In this specification, the term "system" is a logical set of plural apparatuses, and is not limited to one in which apparatuses having configurations are accommodated in a single housing.

What is claimed is:

1. An image processing method comprising:
    calculating flash-component image data based on first image data captured by an image capturing unit without flash emission and second image data captured with flash emission;
    calculating an intensity adjusting value for the flash-component image data by an intensity-adjusting value calculating unit;
    calculating intensity-adjusted-flash-component image data by using the intensity adjusting value; and
    generating adjusted image data by an adjusted image generating unit based on the first image data and the intensity-adjusted-flash-component image data;
    wherein calculating the flash-component image data further includes calculating differential image data representing differences between the first image data and the second image data, and executing white balance control on the differential image data based on a parameter corresponding to the flash emission; and
    wherein the intensity adjusting value for the flash-component image data is calculated using the differential image data.

2. The image processing method according to claim 1, wherein adjusted image data is generated based on:
    (a) white-balance-controlled first image data obtained by executing white balance control on the first image data based on a parameter corresponding to an external light component; and
    (b) intensity-adjusted-flash-component image data obtained by executing intensity adjustment on flash-component image data obtained by executing intensity adjustment based on a parameter corresponding to the flash emission.

3. The image processing method according to claim 1, wherein the intensity adjusting value is calculated as an adjusting value for reducing a number of pixels which have saturated values and which are included in a nonlinear transformation image generated based on combined image data generated by combining the first image data, on which white balance control is performed based on a parameter corresponding to an external light component, and the flash-component image data, on which white balance control is performed based on a parameter corresponding to the flash emission.

4. The image processing method according to claim 3, wherein:
   a nonlinear transformation used for the nonlinear transformation image is gamma correction; and
   the intensity adjusting value is calculated as an adjusting value for reducing the number of pixels which have saturated values and which are included in a gamma correction image.

5. The image processing method according to claim 1, further comprising:
   generating, from the flash-component image data, a flash mask $M_f$ composed of pixels having values equal to or greater than a predetermined threshold value; and
   calculating gain g for adjustment by using the expression:

$$g=\{T^{-1}(\max-k\times \text{std}_{rslt})-\text{avg}_1\}/\text{avg}_F$$

where:
   $T^{-1}$ represents the inverse transformation of nonlinear transformation T;
   max represents a maximum output pixel value;
   k represents a predetermined scalar value;
   $\text{avg}_1$ represents the average of luminances in a portion, which corresponds to the flash mask $M_f$, of white-balance-controlled image data $I_1'$ for the first image data;
   $\text{avg}_F$ represents the average of luminances in a portion, which corresponds to the flash mask $M_f$, of white-balance-controlled image data F' based on the flash-component image data; and
   $\text{std}_{rslt}$ represents the standard deviation of the values of pixels forming a portion, which corresponds to the flash mask $M_f$, of nonlinear-transformation image data $T(F'+I_1')$.

6. The image processing method according to claim 5, wherein:
   intensity-adjusted-flash-component image data F" is calculated based on the expression:

$$F''=gF'$$

where F' represents white-balance-controlled image data; and
   adjusted image data R is calculated based on the expression:

$$R=I_1+F''$$

where $I_1$ represents corrected image data $I_1$, and F" represents intensity-adjusted flash-component image data.

7. The image processing method according to claim 1, further comprising:
   executing motion detection based on the first image data and third image data captured without flash emission; and
   executing pixel-value correction on a detected moving portion.

8. The image processing method according to claim 1, further comprising executing capturing of plural-image data including the first image data and the second image data by controlling flash emission.

9. An image processing apparatus comprising:
   a flash-component-image calculating unit for calculating flash-component image data based on first image data captured without flash emission and second image data captured with flash emission;
   an intensity-adjusting-value calculating unit for calculating an intensity adjusting value for the flash-component image data;
   an intensity-adjusted-flash-component-image calculating unit for calculating intensity-adjusted-flash-component image data by using the intensity adjusting value; and
   an adjusted image generating unit for generating adjusted image data based on the first image data and the intensity-adjusted-flash-component image data;
   wherein calculating the flash-component-image data includes calculating differential image data representing differences between the first image data and the second image data, and executing white balance control on the differential image data based on a parameter corresponding to the flash emission; and
   wherein the intensity adjusting value for the flash-component image data is calculated using the differential image data.

10. The image processing apparatus according to claim 9, wherein the adjusted image data is generated based on:
    (a) white-balance-controlled first image data obtained by executing white balance control on the first image data based on a parameter corresponding to an external light component; and
    (b) intensity-adjusted-flash-component image data obtained by executing intensity adjustment on flash-component image data obtained by executing intensity adjustment based on a parameter corresponding to the flash emission.

11. The image processing apparatus according to claim 9, wherein the intensity adjusting value is calculated as an adjusting value for reducing a number of pixels which have saturated values and which are included in a nonlinear transformation image generated based on combined image data generated by combining the first image data, on which white balance control is performed based on a parameter corresponding to an external light component, and the flash-component image data, on which white balance control is performed based on a parameter corresponding to the flash emission.

12. The image processing apparatus according to claim 11, wherein:
    a nonlinear transformation used for the nonlinear transformation image is gamma correction; and
    the intensity adjusting value is calculated as an adjusting value for reducing the number of pixels which have saturated values and which are included in a gamma correction image.

13. The image processing apparatus according to claim 9, wherein:
    the intensity-adjusting-value calculating unit generates, from the flash-component image data, a flash mask $M_f$ composed of pixels having values equal to or greater than a predetermined threshold value; and
    the intensity-adjusting-value calculating unit calculates gain g for adjustment by using the expression:

$$g=\{T^{-1}(\max-k\times \text{std}_{rslt})-\text{avg}_1\}/\text{avg}_F$$

where:
- $T^{-1}$ represents the inverse transformation of nonlinear transformation T;
- max represents a maximum output pixel value;
- k represents a predetermined scalar value;
- $avg_1$ represents the average of luminances in a portion, which corresponds to the flash mask $M_f$, of white-balance-controlled image data $I_1'$ for the first image data;
- $avg_F$ represents the average of luminances in a portion, which corresponds to the flash mask $M_f$, of white-balance-controlled image data F' based on the flash-component image data; and
- $std_{rslt}$ represents the standard deviation of the values of pixels forming a portion, which corresponds to the flash mask $M_f$, of nonlinear-transformation image data $T(F'+I_1')$.

14. The image processing apparatus according to claim 13, wherein:
intensity-adjusted-flash-component image data F" is calculated by using gain g for adjustment on the basis of the expression;

$$F''=gF'$$

where F' represents a white-balance-controlled image; and
the adjusted image data R is calculated based on the expression;

$$R=I_1+F''$$

where $I_1$ represents corrected image data $I_1$, and F" represents intensity-adjusted flash-component image data.

15. The image processing apparatus according to claim 9, further comprising:

a motion detecting unit for executing motion detection based on the first image data and third image data captured without flash emission; and
a pixel-value correcting unit for executing pixel-value correction on a moving portion detected by the motion detecting unit.

16. The image processing apparatus according to claim 9, further comprising an image capturing unit for executing capturing of plural-image data including the first image data and the second image data by controlling flash emission.

17. A computer-readable recording medium storing a computer program which, when executed by a processor, performs a method comprising:

calculating flash-component image data based on first image data captured without flash emission and second image data captured with flash emission;
calculating an intensity adjusting value for the flash-component image data;
calculating intensity-adjusted-flash-component image data by using the intensity adjusting value; and
generating adjusted image data based on the first image data and the intensity-adjusted-flash-component image data;
wherein calculating the flash-component image data further includes calculating differential image data representing differences between the first image data and the second image data, and executing white balance control on the differential image data based on a parameter corresponding to the flash emission; and
wherein the intensity adjusting value for the flash-component image data is calculated using the differential image data.

* * * * *